Inventor
Edwin J. Soenksen

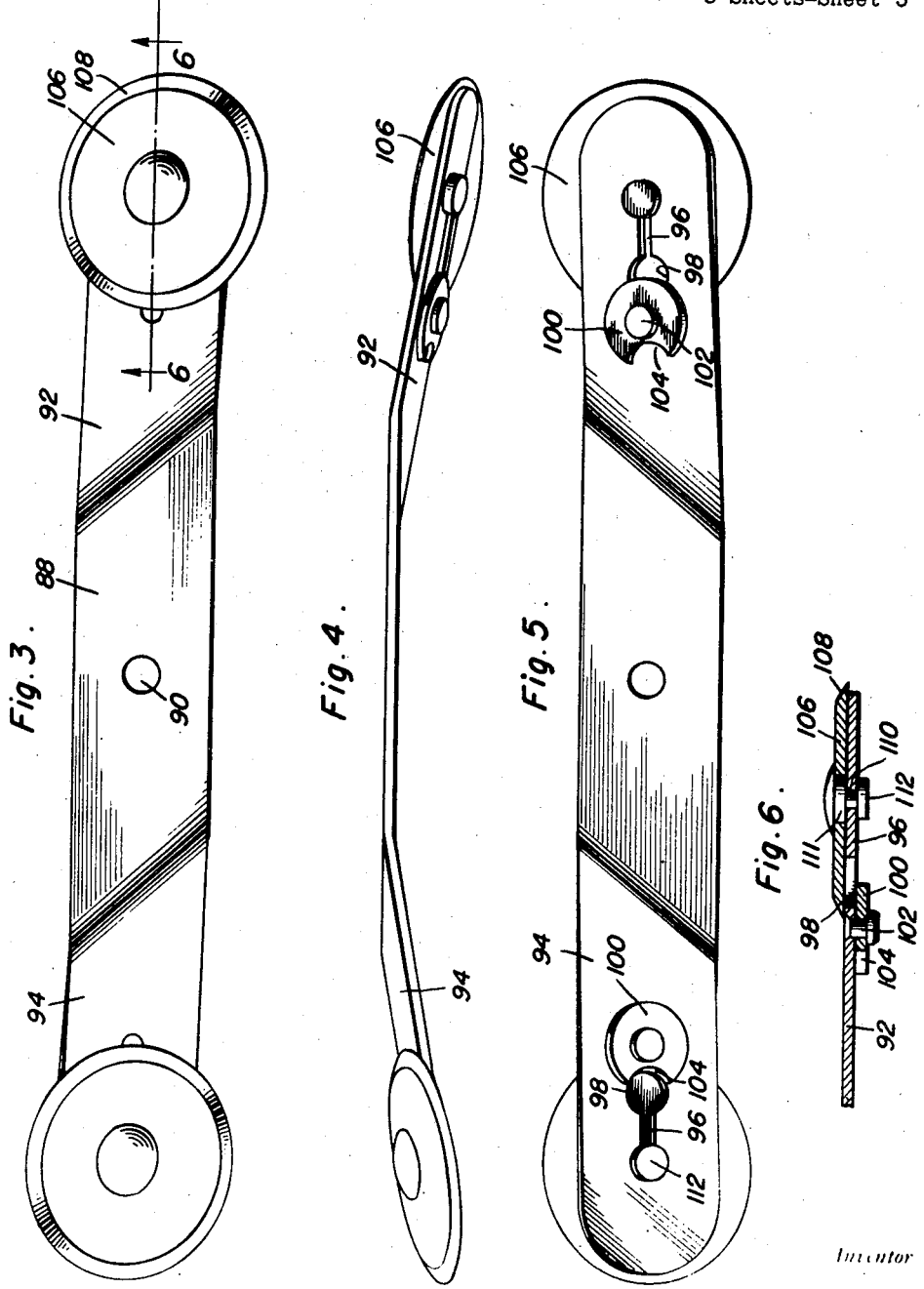

Patented Nov. 29, 1949

2,489,730

UNITED STATES PATENT OFFICE 2,489,730

ATTACHMENT FOR GRASS AND WEED CUTTERS

Edwin J. Soenksen, De Witt, Iowa

Application November 6, 1947, Serial No. 784,359

2 Claims. (Cl. 56—25.4)

This invention comprises novel and useful improvement in an attachment for grass and weed cutters and more specifically pertains to an improved rotary cutter blade together with a generally improved construction of power cutter.

The primary purpose of this invention resides in providing an improved cutter blade having removable and replaceable cutting knives thereon together with an improved means for locking the knives in their mounting upon the cutter blade.

A further important purpose of this invention resides in the provision of an improved supporting and adjusting means for the frame of the mower.

These, together with further ancillary objects of the invention which will later become apparent as the following description proceeds, are attained by this device, a preferred embodiment of which has been illustrated by way of example only in the accompanying drawings, wherein:

Figure 3 is a top plan view upon a somewhat enlarged scale of the improved cutter blade of the invention;

Figure 4 is a side elevational view of Figure 3;

Figure 5 is a bottom plan view of the cutter blade; and

Figure 6 is an enlarged detail view taken in vertical longitudinal section substantially upon the plane of the section line 6—6 of Figure 3.

Figure 1:
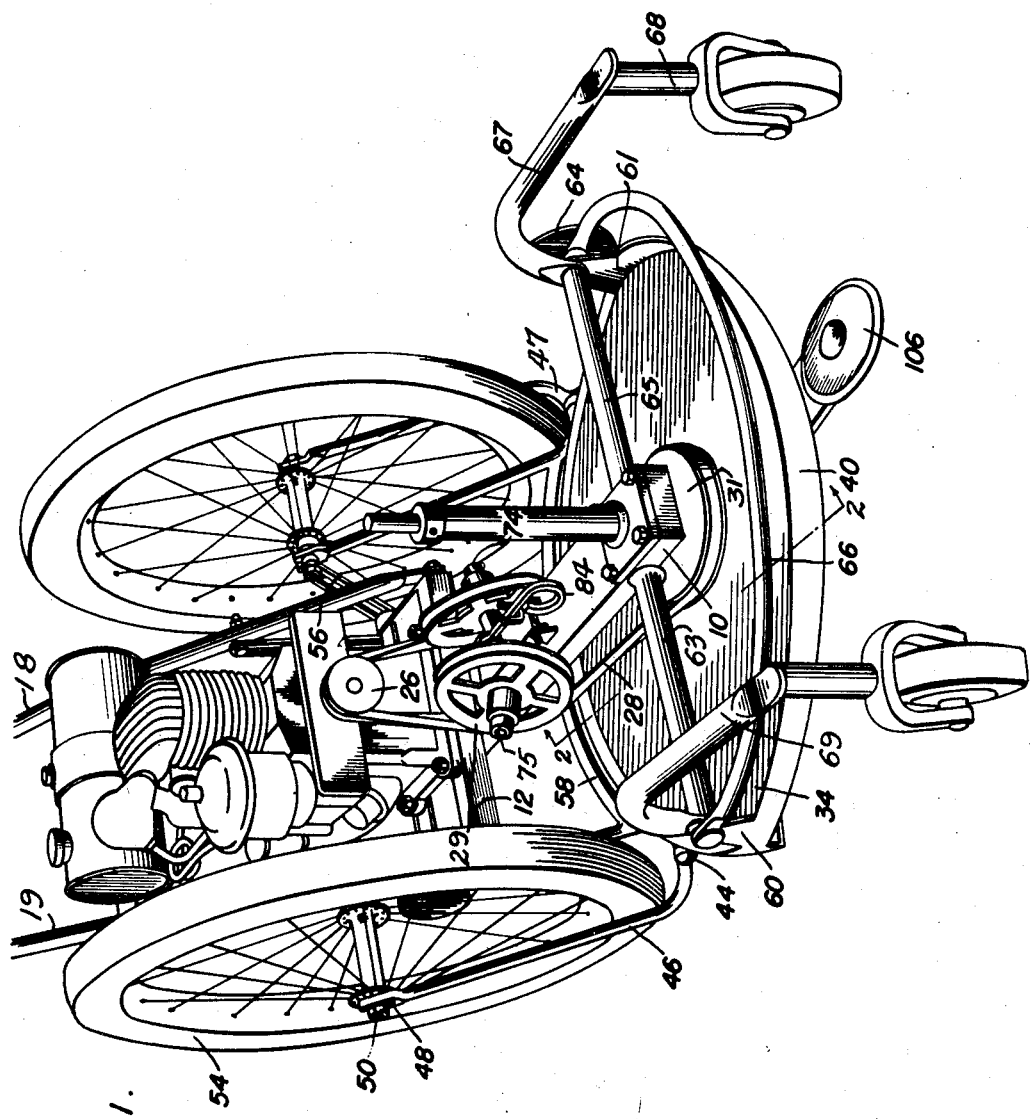
Figure 1 is a perspective view of the improved mower embodying the features of construction of this invention.
Figure 2:
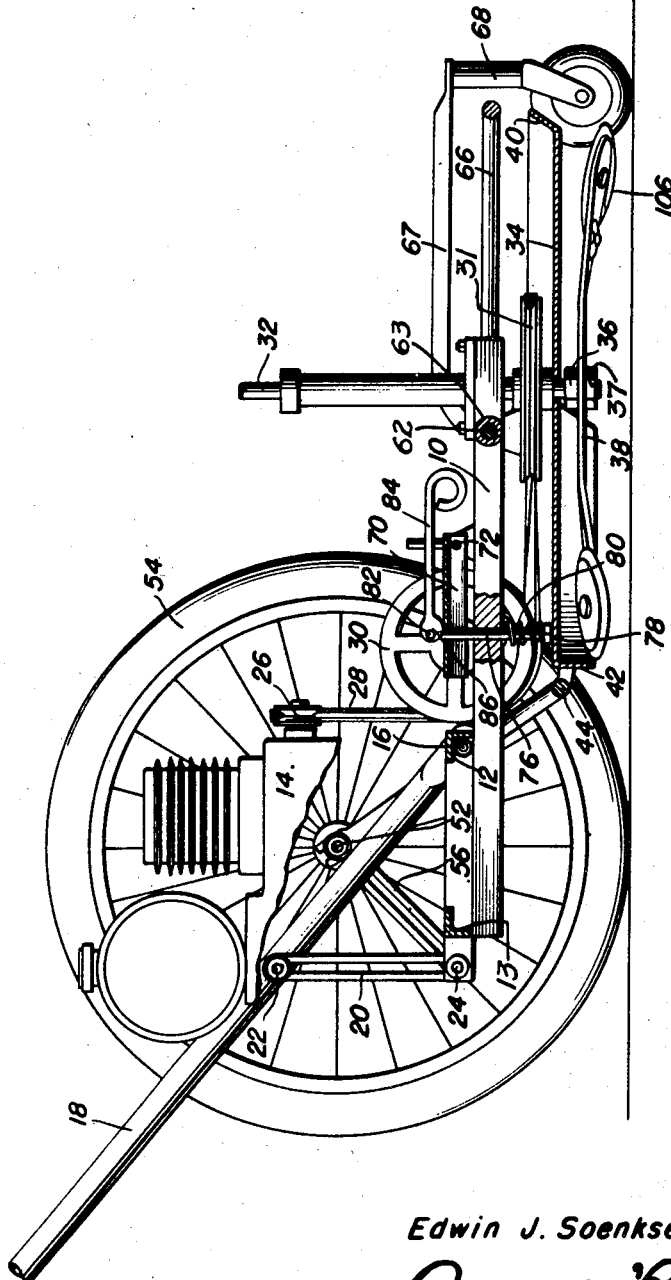
Figure 2 is a vertical longitudinal sectional view through the mower of Figure 1, taken substantially upon the plane of the line 2—2 of Figure 1, showing details of construction.

Referring now more specifically to the accompanying drawings, wherein like numerals designate similar parts throughout the several views, it will be seen that numeral 10 designates a portion of the frame of the device which as shown comprises an elongated member having transverse supporting bars 12 and 13 constituting a platform upon which is suitably mounted a power source such as internal combustion engine indicated generally at 14. Pivotally mounted as by fastening bolts, one of which is indicated at 16, are a pair of upwardly and rearwardly extending handle members 18 and 19, which are angularly adjustable relative to the frame by means of slotted supporting rods one of which is shown at 20, which are fastened to the handles and to the frame as by fastening means 22 and 24 respectively. As will be readily seen, the bolts 22 and/or 24 may be loosened, the slotted rod 20 adjusted therethrough, as the angle of the handle 18 is varied relative to the frame, and the bolts then secured thereby locking the handle into the desired position of adjustment.

The motor is provided with a power take-off or driving pulley 26, a belt drive comprising an endless belt 28 which extends about a pair of idler pulleys 29 and 30 which as shown in Figure 1 are inclined relative to each other and to a vertical plane, said belt then extending about a driven pulley 31 suitably mounted upon a vertically disposed driven shaft 32 journaled in any desired manner in the frame member 10.

Below the frame member 10, the driven shaft 32 is provided with the above-mentioned driven pulley, and then extends downwardly through a circular shield 34, and terminates at its lower extremity in a screw-threaded portion having adjusting nuts 36 and 37 by means of which a cutter blade or bar 38 is retained upon the driven shaft 32 in vertically adjusted position.

At its forward end, the annular shield 34 is upturned as at 40 to provide a deflecting baffle for directing grass or other material into the path of travel of the horizontally rotating cutter bar 38, while the rear end of the shield 34 is downwardly turned to provide an arcuate rim 42 at the rear of the cutter blade for preventing material cut by the blade or objects struck thereby from being thrown backward against the operator or into the machinery of the mower. Rigidly secured to the rear portion of the shield 34 as by fastening bolts, one of which is shown at 44, is a supporting frame having a pair of upwardly and rearwardly inclined forks 46 and 47 each member of each fork being longitudinally slotted at its upper and outer extremity as at 48, for adjustable clamping engagement as by means of a bolt 50, upon the axle 52 of the supporting wheels 54 of the mower. As shown best in Figure 1, a slotted reinforcing bar 56 is adjustably connected to the axle 52 as by the above-mentioned fastening nuts 50 and to the frame as by the previously mentioned fastening bolts 24, whereby the wheels may be readily adjusted relative to the framework.

An arcuate transversely extending reinforcing member 58 connects the two forks 46 to form a rigid assembly therewith.

Upon each side of the shield 34 are upwardly extending lugs 60 and 61 which receive a fastening bolt 62 extending therebetween and journaled in a transverse bore in the end of the frame member 10. This bolt is secured by a suitable nut 64 upon a screw-threaded outer extremity. An arcuately shaped guard rail or member 66 has its extremities journaled upon the bolt 62, this guard member extending forwardly and above the front end of the shield 34 and the front portion of the path of travel of the rotating cutter blade 38. Likewise journaled upon the bolt 62 are a pair of forwardly extending arms 67 and 69 upon whose outer extremities are swivelly mounted a pair of casters 68 and 71. Sleeves 63 and 65 embrace the bolt and are abutted against the frame 10 and the arms 57 and 69. The bolt 62 thus clamps through the sleeves, the arms 67, 69 to the inner surface of the lugs 60, 61 and the ends of the guard 66 to the outer sides of the lugs. The arrangement is such that the nut 64 may be loosened upon the bolt 62, whereby the guard 66 may be adjusted as desired, and the individual caster supporting arms 67 may be individually adjusted about the axis of the bolt, and the nut 64 thereafter tightened to lock the bars in their adjusted position.

By the above-mentioned adjusting means, the front end of the frame of the track of the mower may be vertically adjusted with respect to the ground in order to properly position the cutter blade for its operation. As will be noted, the shield 34 is pivotally mounted by means of the lugs 60 and 61 upon the bolt 44, whereby the shield may be oscillatably adjusted about said bolt by proper adjustment of the forks 46 and 47, nuts 50 and reinforcing elements 56.

A combined belt tensioning device and clutch is provided for operatively connecting the driving pulley 26 to the driven pulley 30. This includes a supporting bracket or plate 70 which is pivotally mounted upon the frame 10 as at 72, and which carries stub axles 74 and 75 journaling the idler pulleys 29 and 30 mentioned above. A bolt 76 extends through aligned aperture in the frame 10 and in the plate 70, and is screw-threaded at its lower end and provided with an adjusting nut 78 for adjustably urging the rear portion of the plate 70 and the pulleys 29 and 30 thereon downwardly relative to the frame 10 against the opposition of a spring 80 positioned between the top surface of the nut 78 and the lower surface of the frame 10. The bolt further extends through an aligned aperture in the above mentioned bracket or plate 70, and is provided with a transverse supporting pin 82 at its upper extremity, upon which is journaled an adjusting lever 84 having an adjusting cam 86 disposed about the fulcrum pin 82, the surface of this cam bearing upon the upper surface of the plate 70, for adustingly urging the plate downwardly against the resistance of the spring 80 and against the tension of the belt 28, to thereby cause the pulleys 30 to apply the desired tension to the belt for controlling the operation of the cutter blade by the power source.

Attention is now directed more specifically to Figures 3–6 for a better understanding of the improved construction of the cutter blade. The latter consists of a bar or strip of material having a central portion 88 provided with an axial bore 90 by means of which the cutter blade is secured upon the driven shaft 32. Extending from opposite sides of the central portion 88, are angularly bent end portions 92 and 94 of the blade, these portions being both bent downwardly in the same general direction, but twisted or inclined relative to each other in opposite directions about the central line of the blade. By means of this bend in construction, the cutter elements upon the end of the blade and to be now described are given a greater clearance with the overlying shield portion of the device.

As shown best in Figure 5, the bent portions 92 and 94 are provided adjacent their ends with elongated slots 96, which at their inner extremities are provided with enlarged portions 98. An annular disk 100 constituting a closure member is journaled as at 102 upon the lower surfaces of the bent portions in a position to have its circumference overlie a portion of the enlarged portion 98, but having a notched portion 104 formed in its circumference which is registrable with the enlarged portion to provide an unobstructed passage therethrough. The two closing and opening positions of the closure member are illustrated at the right and left hand ends of Figure 5.

The device envisions a detachable cutter knife for each end of the cutter blade, this knife comprising an annular disk member 106 having a peripherally beveled cutting edge 108, and further having an axially disposed shank or pin 110 extending therefrom and terminating in an enlarged headed end 112, embracing a shoulder 111 of the pin. The size of the shank 110 and of the headed end 112 are such that the shank may be received within and readily slidable in the slot 96; but the headed end 112 may not pass through the slot but is receivable in the enlarged portion 98 whereby the same may be introduced therethrough and the shank seated in the slot. When so positioned, the closure member 100 may be rotated to present its unnotched portion over the enlarged portion 98, to thereby prevent withdrawal of the rotary knives through the opening 98.

It should be here noted that the center of gravity of the closure member 100 is preferably on the opposite side of the axis of the shank 110 from the notch 104, whereby during operation of the device and rotation of the cutter blade 88, centrifugal force will urge the solid or center of gravity portion of the closure 100 into a position to obstruct the opening 98 as shown at the right hand side of Figure 5. To remove the cutter knife, it is therefore necessary to manually rotate the closure member to the position shown at the left hand side of Figure 5, in order that the headed end of the shank 110 of the rotary cutter knife may be aligned with and withdrawn through the opening 98.

From the foregoing, the manner of operating and employing the invention will be readily understood and further explanation is believed to be unnecessary. Since numerous modifications of the inventive concept will be readily understood by those skilled in the art after a consideration of the foregoing specification and accompanying drawings, is not intended to limit the invention to the exact construction shown and described but all suitable modifications and improvements may be resorted to falling within the scope of the appended claims.

Having described the invention, what is claimed as new is:

1. In a mowing device having a frame, a power source on said frame, an axle secured to said frame and supporting wheels on said axle; a rotary cutter bar journaled in said frame, means operatively connecting said cutter bar to said power source, a bolt extending transversely of said frame, support arms for said frame adjustable pivotally of said bolt and journaled thereon, casters swiveled on said arms, and a common fastening means for securing said arms to said bolt in adjusted position.

2. The combination of claim 1 including a guard extending forwardly and above the arc of travel of said bar, said guard being pivotally mounted upon said bolt and adjusted by said common fastening means.

EDWIN J. SOENKSEN.

REFERENCES CITED

The following references are of record in the file of this patent:

UNITED STATES PATENTS

| Number | Name | Date |
| --- | --- | --- |
| 1,992,494 | Lundin | Feb. 26, 1935 |
| 2,263,368 | Sejkora | Nov. 18, 1941 |
| 2,287,126 | Packwood | June 23, 1942 |
| 2,308,076 | Hainke | Jan. 12, 1943 |
| 2,403,236 | Phelps | July 2, 1946 |